United States Patent [19]

Hakala

[11] 4,205,968
[45] Jun. 3, 1980

[54] METHOD AND APPARATUS FOR SEPARATING DUST FROM AIR STREAMS

[75] Inventor: Reynold M. Hakala, Stillwater, Minn.

[73] Assignee: The De Laval Separator Company, Poughkeepsie, N.Y.

[21] Appl. No.: 628,602

[22] Filed: Nov. 4, 1975

[51] Int. Cl.² ................. B01D 47/02; B01D 50/00
[52] U.S. Cl. ................................. 55/92; 55/95; 55/238; 55/239; 55/241; 55/248; 55/257 R; 55/346; 261/109; 261/112
[58] Field of Search ............ 55/92, 95, 226, 237–239, 55/241, 248, 249, 257 C, 257 R, 318, 346, 461; 261/109, 112, 119, DIG. 54

[56] References Cited

U.S. PATENT DOCUMENTS

| 867,240 | 10/1907 | Brunner et al. | 55/346 X |
|---|---|---|---|
| 1,501,110 | 7/1924 | Harrison | 55/248 |
| 1,637,597 | 8/1927 | Ulrici | 55/241 X |
| 2,135,201 | 11/1938 | Rice | 55/257 C X |
| 2,691,423 | 10/1954 | McIlvaine | 55/249 |
| 3,170,384 | 2/1965 | Krantz et al. | 261/112 X |
| 3,279,156 | 10/1966 | Wilhelmsson et al. | 55/257 C X |
| 3,518,815 | 7/1970 | McFarland et al. | 55/241 |
| 3,751,882 | 8/1973 | Phillips | 55/257 C X |
| 3,810,349 | 5/1974 | Rebours | 55/248 |
| 3,827,216 | 8/1974 | Mare | 55/95 |

FOREIGN PATENT DOCUMENTS

| 57368 | 8/1945 | Netherlands | 55/238 |
|---|---|---|---|
| 569866 | 6/1945 | United Kingdom | 261/112 |

*Primary Examiner*—Kathleen J. Prunner
*Attorney, Agent, or Firm*—Cyrus S. Hapgood

[57] ABSTRACT

A particle-containing air stream is passed downwardly through an orifice into a housing and toward an upwardly facing target area in the housing while directing a flow of liquid upwardly through said target area and thence outwardly in generally horizontal paths extending in opposite directions along said area and along extensions of said area, whereby particles from the air stream are entrained in the liquid flows in said opposite directions. Particle-laden liquid is discharged through bottom outlets of the chamber at the outer ends of said horizontal liquid paths, while passing divided streams with remaining particles upwardly from the respective horizontal liquid paths and into respective chambers where particles are separated by a cyclonic action from the air streams before they discharge from the chambers.

10 Claims, 4 Drawing Figures

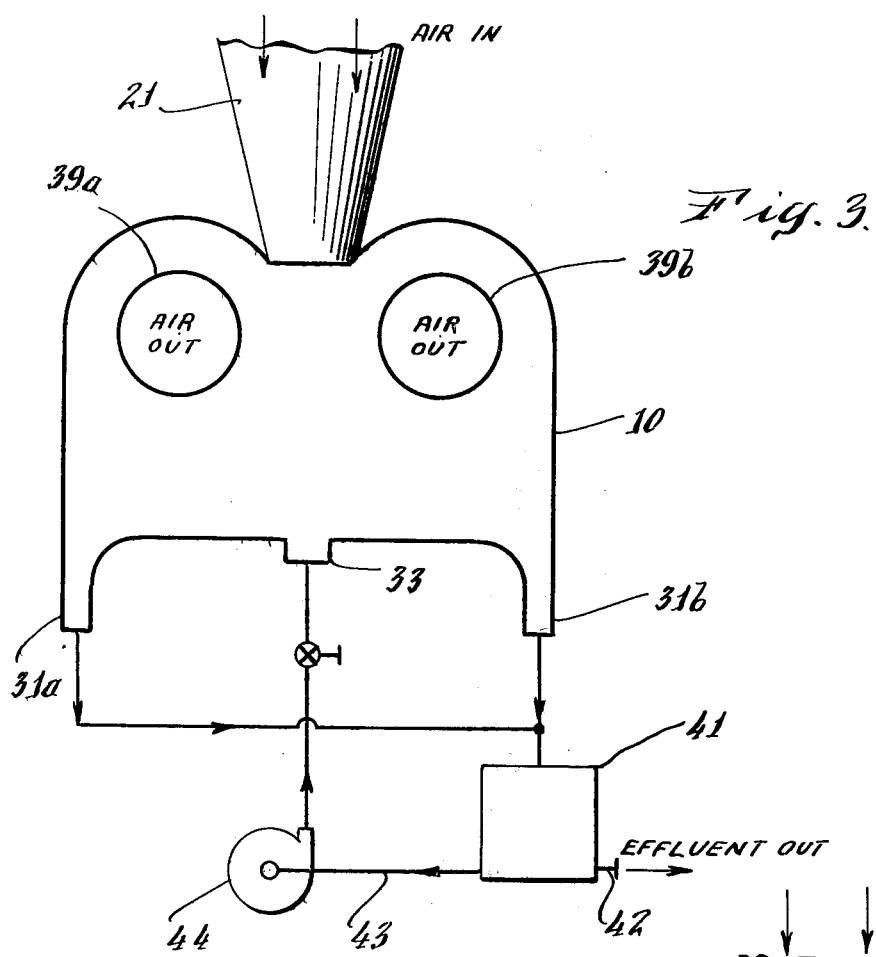
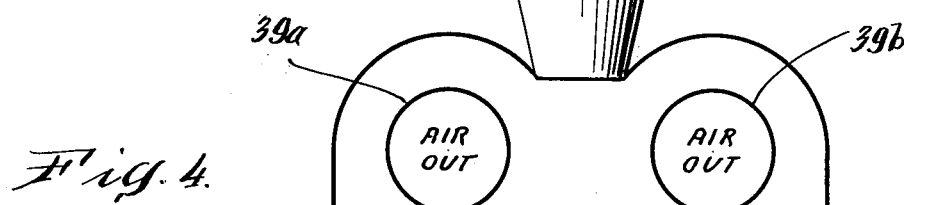

METHOD AND APPARATUS FOR SEPARATING DUST FROM AIR STREAMS

This invention relates to the separation of particulate matter from an air stream, such as the exhaust air stream from a spray drier or other air-contaminating apparatus. The invention relates more particularly to a novel method and apparatus for effecting such a separation with the use of an impinger.

Prior attempts to effect such a separation have left much to be desired. In particular, they have required intricate and costly equipment and/or they have resulted in a poor separation.

The principal object of the present invention is to provide a separation method and apparatus which overcome the disadvantages inherent in these prior attempts.

According to the new method, the particle-containing air stream is passed through an orifice into a housing and toward a target area in the housing while directing a flow of liquid through the target area and thence outwardly in generally horizontal paths extending in opposite directions along the target area and along extensions of that area, whereby particles from the air stream are entrained in the liquid flows in said opposite directions. Particle-laden liquid is discharged through outlets of the housing at the outer ends of the horizontal liquid paths, while passing divided air streams with remaining particles from the respective liquid paths and into respective cyclone chambers of said housing, the divided air streams being discharged through separate air outlets from the respective cyclone chambers.

A preferred apparatus made according to the invention comprises a housing forming two collection chambers and having an inlet passage for receiving the particle-containing air stream, this passage having a downwardly facing discharge orifice. The housing has plate means forming a target area to which the air stream is directed downwardly by the inlet passage; and a liquid supply passage below the plate means opens upwardly through the target area for supplying liquid thereto, the plate means having surfaces extending outwardly from the target area and at least partly forming the bottoms of the respective chambers. The housing has bottom outlets to which particle-laden liquid is conveyed outwardly along said surfaces and in opposite directions from the target area, the chambers having respective air outlets spaced upwardly from the plate means.

Each collection chamber forms a cyclone having a substantially horizontal axis spaced above the plate means and extending generally at right angles to said opposite directions, the air outlets being located on the respective cyclone axes.

These and other features of the invention will now be described in detail with reference to the accompanying drawings, in which:

FIGS. 3 and 4 are schematic views of two different systems embodying the new apparatus.

Figure 1:
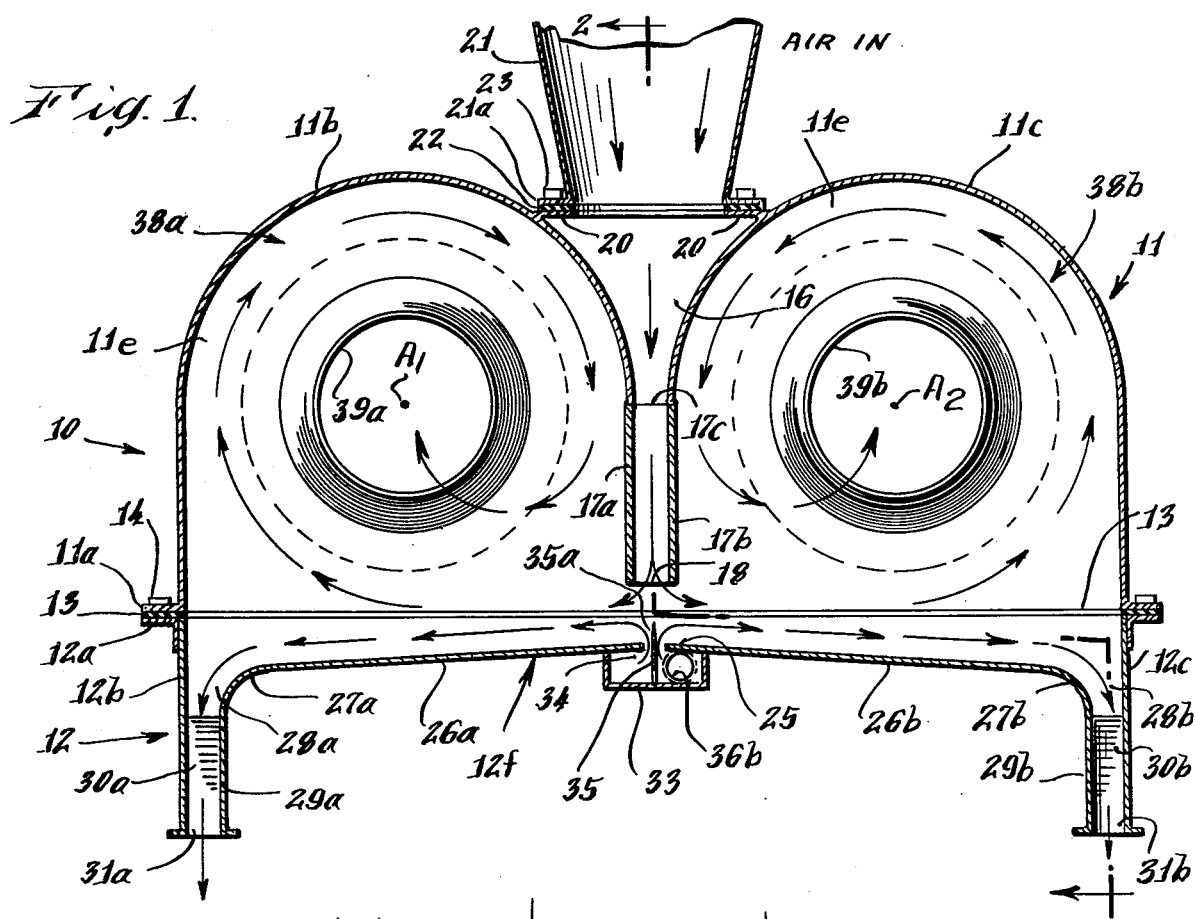
FIG. 1 is a cross-sectional view of a preferred form of the new apparatus.

The apparatus as illustrated comprises a housing shown generally at 10 and which includes upper and lower sections shown generally at 11 and 12, respectively. The upper section 11 has a horizontal flange 11a extending outwardly along its lower edge, and the lower section 12 has a horizontal flange 12a extending outwardly along its upper edge. A gasket 13 extends completely around the housing between the opposed flanges 11a–12a, these parts being clamped together by releasable fasteners such as screws 14, thereby providing an air-tight releasable joint between the two housing sections.

The upper housing section 11 has two arcuate upper parts 11b and 11c. These parts are spaced from each other and curve around parallel axes A1 and A2, respectively. The housing section 11 also includes opposite verticle side walls 11d and 11e joined to the arcuate walls 11b–11c and extending transversely thereof. A downwardly tapering nozzle 16 is formed by the adjacent inner portions of the arcuate upper parts 11b–11c. This nozzle is rectangular in horizontal cross-section, its short sides being formed by the housing's side walls 11d–11e and its long sides being formed by the arcuate upper parts 11b–11c.

Vertical plates 17a and 17b are welded to the lower inner edges of the arcuate upper parts 11b–11c, respectively, these plates extending parallel to the axes A1 and A2. A vertical cross member 17c holds the central portions of plates 17a and 17b in spaced relation, and the opposite ends of these plates are welded to the housing side walls 11d and 11e. The parts including plates 17a–17b thus form a downward extension of the nozzle 16, this extension having uniform through-flow area which is the same as that of the lower end of nozzle 16. The nozzle extension has a downwardly facing discharge orifice 18.

A horizontal flange 20 is welded to the arcuate upper parts 11b–11c at their inner portions and to the opposed vertical side walls 11d–11e where these walls extend between the adjacent arcuate parts 11b and 11c. The four-sided flange 20 thus forms a rectangular entrance to the nozzle 16. A duct 21 is provided for supplying dust-laden air exhausted from a spray drier (not shown). The lower end of this duct is rectangular and has an outwardly extending peripheral flange 21a. A gasket 22 is interposed between the flanges 20 and 21a, these parts being clamped together by releasable fasteners 23 to provide a sealed joint. It will be apparent from FIGS. 1 and 2 that the opposing long sides of duct 21 converge downwardly while the opposing short sides of the duct diverge downwardly.

The lower housing section 12 has opposite end walls 12b and 12c which are aligned with the outer portions of the arcuate upper parts 11b and 11c, respectively, of the upper section. The lower section 12 also has opposite side walls 12d and 12e aligned with the upper side walls 11d and 11e, respectively. The bottom of section 12, shown generally at 12f, forms a horizontal target area 25 directly below the discharge orifice 18. This target area is of substantially the same shape and area as the discharge orifice.

The housing bottom 12f constitutes in effect a plate means forming target area 25 and also forming surfaces 26a and 26b extending outwardly in opposite directions from the target area. The plate surfaces 26a–26b slope slightly downward from the target area 25 and merge at their outer ends with downwardly curving surfaces 27a and 27b. The latter surfaces lead into troughs 28a and 28b, respectively, partly defined by the end walls 12b–12c and by downward extensions 29a–29b of the curved surfaces 27a–27b. The troughs 28a–28b have bottoms 30a and 30b, respectively, which slope downwardly from their opposite ends to respective bottom outlets 31a and 31b.

Figure 2:
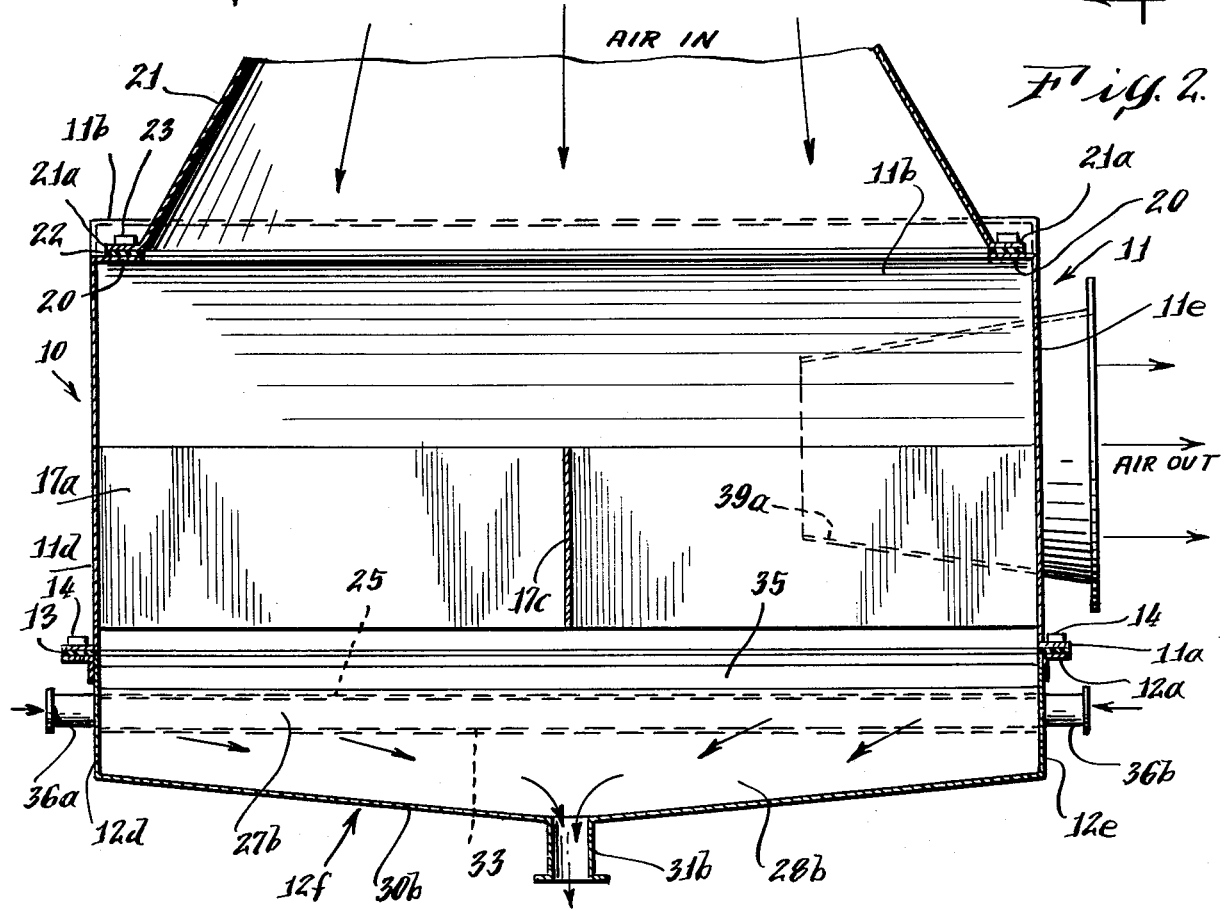
FIG. 2 is a longitudinal sectional view on line 2—2 in FIG. 1.

A liquid supply manifold 33 is secured to the lower face of the housing bottom 12f directly below the target area 25. This manifold opens upwardly into the target area through a slot 34 in the housing bottom. A vertical plate 35 projects upwardly from manifold 33 and slot 34 so as to divide the slot into two subslots of equal width, for example, one-sixteenth of an inch. The manifold 33, slot 34 and plate 35 extend the full width of the housing (i.e., from one to the other of the side walls 12d and 12e), as does the discharge orifice 18. As shown in FIG. 1, the upper edge 35a of the divider plate is a knife edge and is centered relative to the two long edges of orifice 18.

The manifold 33 is provided at its ends with liquid inlets 36a and 36b which lead, respectively, to the two sections of the manifold on opposite sides of the divider plate 35.

As will be understood from the foregoing, the housing 10 forms two chambers 38a and 38b (FIG. 1) separated from each other except at their lower portions by inlet nozzle 16 and its extension 17a–17b, the bottoms of these chambers being constituted by the plate surfaces 26a and 26b, respectively. The chambers 38a and 38b have air outlets formed by tapered tubes 39a and 39b, respectively, mounted in side wall 11e of the housing. These tubes project into the chambers and are concentric to the respective axes A1 and A2, each tube being surrounded by a substantial area of wall 11e.

In the operation of the apparatus, water or other suitable liquid is delivered under pressure through inlets 36a–36b to manifold 33, from which the water is forced upwardly through slot 34 in two streams at opposite sides of divider plate 35. At the same time, the dust-laden air stream from duct 21, having acquired increased velocity in passing through nozzle 16, is directed downwardly from orifice 18 and toward the target area 25. Thus, the incoming air stream is split into two parts by divider plate 35, and each part impinges upon the target area so that the dust particles are largely entrained in the water streams from slot 34. These water streams flow outwardly in opposite directions along plate surfaces 26a–26b, from which they impinge against the housing end walls 12b and 12c. The two water streams with their entrained particles then enter the troughs 28a–28b and are discharged through the bottom outlets 31a and 31b, respectively. The paths of the water flow are indicated by broken lines with arrows in the lower part of FIG. 1.

The two parts of the air stream from divider plate 35 flow outwardly in opposite directions into the respective chambers 38a and 38b. As shown in FIG. 1, the air stream in chamber 38a flows clockwise around the axis A1 while the air stream in chamber 38b flows counterclockwise around the axis A2, the air streams then discharging axially through the respective outlets 39a and 39b. Thus, dust particles remaining in these air streams are separated therefrom by a cyclone action as the streams flow to their outlets. These separated particles will descend in the chambers and become entrained in the underlying water streams flowing along the respective plate surfaces 26a and 26b. The paths of the air streams are shown in FIG. 1 by the solid lines with arrows.

It will be apparent from the foregoing that the apparatus has no moving parts and yet acts on the incoming air stream to rid it of at least the main portion of its particles, which are discharged in the water streams from the bottom outlets 31a–31b. The water streams from slot 34 also prevent dust particles from accumulating on the target area 25 and the other surfaces contacted by the water streams. Moreover, because of the releasable joints 11a–12a–13 and 20–21a–22, the housing can be readily disassembled for cleaning or repair and then reassembled.

Referring now to FIG. 3, the water and entrained solids discharging from bottom outlets 31a–31b are passed to a balance tank 41. From the latter, part of its content are discharged at 42 as effluent. The remainder is drawn through pipe 43 to pump 44 and thence delivered to manifold 33 as the liquid to be forced through slot 34 (FIG. 1). This system may be used in industrial processes where an in-line process is not possible, or where the effluent is disposed of by other means.

The collection system shown in FIG. 4 may be used for sanitary applications or for any other system where recycling of solids is possible. As shown in FIG. 4, a liquid stream from the processing is passed through duct 46, and part of this stream is delivered through pipe 47 to manifold 33. The remainder of this stream passes through pipe 48 where it is joined by the dust-laden liquid discharging through bottom outlets 31a–31b via pump 44a. The resulting mixture is returned to the processing via pipe 48a.

I claim:

1. For separating particulate matter from an air stream, an impinger apparatus comprising a housing forming two collection chambers and having an inlet passage for receiving the particle-containing air stream, said passage having a discharge orifice located between the collection chambers, the housing having plate means in opposed spaced relation to said orifice and forming a target area to which the air stream is directed by said inlet passage, said target area being configurated to divide the air stream from said passage into separate branches which enter the respective collection chambers, means forming a liquid supply passage adjacent the plate means, a liquid source communicating with said supply passage, said target area being substantially imperforate except that the liquid supply passage opens through the target area for supplying liquid thereto, the plate means having surfaces extending in opposite directions from the target area and forming liquid-conveying surfaces of the respective collection chambers, each said chamber forming a cyclone having a generally central axis around which a corresponding one of said stream branches is adapted to flow, said chambers having respective air outlets spaced from the plate means and located on the respective cyclone axes, the housing having liquid outlets from the respective collection chambers and to which said liquid-conveying surfaces lead, whereby the liquid discharging through said liquid outlets is laden with particles acquired partly at said target area and partly from said inlet passage by way of the respective cyclones.

2. The apparatus of claim 1, in which said inlet passage is partly defined by a pair of opposed walls of the housing which converge downwardly between said chambers and toward said orifice and partly define said chambers.

3. The apparatus of claim 2, in which said orifice is substantially rectangular and elongated in a direction generally at right angles to said opposite directions, the elongated edges of the orifice being formed by said opposed walls.

4. The apparatus of claim 3, in which the plate means form a slot extending along the target area substantially parallel to said elongated edges of the orifice, said liquid supply passage opening upwardly through said slot.

5. The apparatus of claim 4, comprising also a vertical plate extending along said slot to divide the flow from said liquid supply passage into two parts before reaching the target area, said two parts flowing along the plate means in said opposite directions, respectively.

6. The apparatus of claim 2, in which said inlet passage has a through-flow area which decreases toward the discharge orifice, thereby increasing the flow velocity of the air stream.

7. The apparatus of claim 1, comprising also a member positioned to divide the flow from said liquid supply passage into two parts before reaching the target area, said two parts flowing along the plate means in said opposite directions, respectively.

8. The apparatus of claim 1 wherein the housing has opposing side walls against which the particle-laden liquid is adapted to impinge outwardly from said surfaces of the plate means, said liquid outlets being located adjacent said opposing walls, respectively.

9. The apparatus of claim 8, in which each collection chamber forms an air flow path curving upwardly from the plate means along a said side wall and around the corresponding cyclone axis extending generally at right angles to said opposite directions, each chamber having an end wall provided with a said air outlet located on said axis, whereby each chamber acts to separate particles from the air flowing to the air outlet.

10. In the separation of particulate matter from an air stream, the method which comprises passing the particle-containing air stream through an orifice into a housing and toward a target area in the housing, simultaneously directing a liquid through said target area and thence outwardly in liquid flow paths extending in opposite directions along said area and along extensions of said area, whereby particles from the air stream are entrained in the liquid flows in said opposite directions, passing branches of said air stream with remaining particles from said orifice in said opposite directions and into respective cyclone chambers of the housing, separating particles from each branch air stream by cyclone action in the corresponding chamber, passing the separated particles from each cyclone chamber into a corresponding one of said liquid flow paths, discharging the branch air streams separately from the respective cyclone chambers, and discharging streams of particle-laden liquid separately from the housing at the outer ends of said liquid flow paths.

* * * * *